(12) United States Patent  (10) Patent No.: US 10,539,294 B2
Kürschner et al.  (45) Date of Patent: Jan. 21, 2020

(54) AUTOMOBILE EXTERIOR REAR VIEW MIRROR BLIND SPOT WARNING INDICATION DEVICE

(71) Applicants: SMR Patents S.à.r.l., Luxembourg (LU); Ningbo SMR Huaxiang Automotive Mirrors Ltd., Xiangshan, Zhejiang Province (CN)

(72) Inventors: Norbert Kürschner, Wedemark (DE); Daniel Fritz, Stuttgart (DE); Yifei Feng, Zhejiang (CN); Yonggang Li, Zhejiang (CN); Weiping Lu, Zhejiang (CN)

(73) Assignees: SMR Patents S.à.r.l., Luxembourg (LU); Ningbo SMR Huaxiang Automotive Mirrors Ltd., Xiangshan (CN)

( * ) Notice: Subject to any disclaimer, the term of this patent is extended or adjusted under 35 U.S.C. 154(b) by 0 days.

(21) Appl. No.: 16/522,074

(22) Filed: Jul. 25, 2019

(65) Prior Publication Data

US 2019/0346111 A1 Nov. 14, 2019

Related U.S. Application Data

(63) Continuation-in-part of application No. 15/916,650, filed on Mar. 9, 2018, now Pat. No. 10,415,792.
(Continued)

(30) Foreign Application Priority Data

Jan. 19, 2015 (EP) ..................................... 15151604

(51) Int. Cl.
*F21V 7/00* (2006.01)
*B60Q 1/52* (2006.01)
(Continued)

(52) U.S. Cl.
CPC .......... *F21V 7/0091* (2013.01); *B60Q 1/2607* (2013.01); *B60Q 1/2665* (2013.01);
(Continued)

(58) Field of Classification Search
CPC .. F21V 7/0091; F21V 7/22; F21V 9/08; F21S 43/239; F21S 43/315; B60Q 1/2607;
(Continued)

(56) References Cited

U.S. PATENT DOCUMENTS 7,097,334 B2 * 8/2006 Ishida .................... F21S 41/147
362/516
7,331,694 B2 * 2/2008 Lee ....................... G02B 6/0018
362/231
(Continued)

FOREIGN PATENT DOCUMENTS

CN 102529816 A 7/2012
CN 105936241 A 9/2016
(Continued)

*Primary Examiner* — Bryon T Gyllstrom
(74) *Attorney, Agent, or Firm* — MacMillan, Sobanski & Todd, LLC

(57) ABSTRACT

A blind spot warning indication device for an exterior mirror of an automobile includes a light guide member. A plurality of wedge-shaped bosses are arranged side by side along an axis on the light guide member corresponding to a setting direction of the PCB. One side of each of the plurality of wedge-shaped bosses has a light incident end surface for aligning with a corresponding light source. An upper surface of each of the plurality of wedge-shaped bosses includes a light reflecting side having an optical pattern for reflecting and scattering. The reflecting side having the optical pattern is an upwardly convex arc surface. A lower surface of the wedge-shaped boss has a light emitting side. The outermost wedge-shaped boss has the largest curvature of the light-reflecting side compared to the other wedge-shaped bosses arranged side by side, and the outermost wedge-shaped boss
(Continued)

has the longest length of the light-emitting side compared to the other wedge-shaped bosses arranged side by side. The device has the functions of reflection and scattering at the same time. The uniformity of the emitted light at the front surface and certain angles is better, and the warning effectiveness is improved. The LOGO pattern can be better combined with the emitted light.

20 Claims, 7 Drawing Sheets

Related U.S. Application Data which is a continuation of application No. 15/000,733, filed on Jan. 19, 2016, now Pat. No. 10,168,021.

(51) Int. Cl.

| | |
|---|---|
| F21V 8/00 | (2006.01) |
| B60R 1/12 | (2006.01) |
| B60Q 1/26 | (2006.01) |
| F21V 7/22 | (2018.01) |
| F21S 43/239 | (2018.01) |
| F21V 9/08 | (2018.01) |
| F21S 43/31 | (2018.01) |
| F21S 43/249 | (2018.01) |
| F21S 43/14 | (2018.01) |

(52) U.S. Cl.
CPC ........... *B60Q 1/2696* (2013.01); *B60Q 1/525* (2013.01); *B60R 1/1207* (2013.01); *F21S 43/239* (2018.01); *F21S 43/315* (2018.01); *F21V 7/22* (2013.01); *F21V 9/08* (2013.01); *G02B 6/0046* (2013.01); *G02B 6/0055* (2013.01); *F21S 43/14* (2018.01); *F21S 43/249* (2018.01); *G02B 6/0078* (2013.01)

(58) Field of Classification Search
CPC .... B60Q 1/2665; B60Q 1/2696; B60Q 1/525; B60R 1/1207; G02B 6/0046; G02B 6/0055

USPC .......................................................... 362/511
See application file for complete search history.

(56) References Cited

U.S. PATENT DOCUMENTS

| | | | | |
|---|---|---|---|---|
| 7,771,062 | B2* | 8/2010 | Kuhn | B60Q 1/2665 359/839 |
| 7,857,495 | B2* | 12/2010 | Misawa | B60Q 1/2607 362/511 |
| 8,477,044 | B2 | 7/2013 | Wagner et al. | |
| 2002/0071267 | A1* | 6/2002 | Lekson | F21S 43/249 362/610 |
| 2002/0163790 | A1 | 11/2002 | Yamashita | |
| 2003/0235046 | A1* | 12/2003 | Chinniah | F21S 41/24 362/602 |
| 2007/0058257 | A1 | 3/2007 | Lynam | |
| 2007/0211487 | A1* | 9/2007 | Sormani | F21S 41/285 362/545 |
| 2007/0248714 | A1 | 10/2007 | Dean et al. | |
| 2008/0013333 | A1* | 1/2008 | Koizumi | B60Q 1/2696 362/511 |
| 2009/0115631 | A1 | 5/2009 | Foote et al. | |
| 2011/0085343 | A1* | 4/2011 | Ohno | F21S 41/24 362/510 |
| 2013/0188377 | A1* | 7/2013 | Konishi | B60Q 1/04 362/511 |

FOREIGN PATENT DOCUMENTS

| | | |
|---|---|---|
| CN | 205686302 U | 11/2016 |
| CN | 106828324 A | 6/2017 |
| CN | 206383887 U | 8/2017 |
| EP | 2119595 A1 | 11/2009 |
| EP | 2123514 A1 | 11/2009 |
| EP | 2463157 A1 | 6/2012 |
| EP | 2463157 B1 | 4/2015 |
| WO | 2006017019 A1 | 2/2006 |
| WO | 2018137654 A1 | 8/2018 |

\* cited by examiner

AUTOMOBILE EXTERIOR REAR VIEW MIRROR BLIND SPOT WARNING INDICATION DEVICE

CROSS-REFERENCE TO RELATED APPLICATIONS

This application is a continuation-in-part application of U.S. patent application Ser. No. 15/916,650, filed Mar. 9, 2018, which is a continuation application of U.S. patent application Ser. No. 15/000,733, filed Jan. 19, 2016, now U.S. Pat. No. 10,168,021, issued Jan. 1, 2019, and further claims the benefit of European Patent Application No. EP 15151604.4, filed Jan. 19, 2015. The disclosure of these applications are incorporated herein by reference in their entirety.

BACKGROUND OF THE INVENTION

This invention relates in general to automotive rear view mirrors, and more particularly to a blind spot warning indication device for an exterior mirror of a vehicle, such as an automobile.

This invention further relates to a light guiding device for an illumination device, such as a backlight or interior or exterior lighting, wherein incident light is deflected by reflection. The light guiding device can particularly be used in an indicator of a motor vehicle, in connection with a blind spot monitor in an outside mirror for example. The invention also relates to a like illumination device, an outside mirror having such a light guiding device and a method for producing such a light guiding device.

The exterior mirrors of automobiles are auto parts for the driver to observe the moving state of vehicles and pedestrians behind while driving. It is a necessary guarantee for safe driving. The angle of the rearview mirror can be adjusted with the help of a mirror driver of the exterior mirror of the automobile, and it allows the driver to observe a specific field of view for safe driving. As we all know now, during the driving of a car, the driver has blind spots. These blind spots are the positions that the driver can't see when the driver looks at the mirror. Viewing these blind spots requires the driver to turn the head or even stretch the neck to see if some other objects have entered the blind spot. In order to realize the blind spot indication function, at present, both domestic and foreign technologies use a radar signal to detect the object in the blind spot and transmit the signal to a driving computer. Then a command is issued through the driving computer to control an indicator light on the back of the mirror of the rear view mirror to blink. Light is guided into the driver's eyes for alert purposes. The difficulty of such a technology is that the warning indicator should be bright enough from the driver's point of view, and should be dark enough at other angles to achieve the desired warning effect.

The existing blind spot warning indication device for the exterior mirror of the automobile, such as the publication number CN205686302U, is a blind spot warning indication device for the exterior mirror of the automobile, which optimizes the angle of the emitted light and increases the uniformity of light emission in a certain range. Therefore, it can meet the requirement that the warning light should be bright enough from the driver's point of view, and should be dark enough at other angles, and the warning effectiveness can be improved. However, the problem is that the uniformity of the light guide member is poor, mainly because it has only a reflection function but no scattering effect. This results in poor uniformity at the front and certain angles, and there are certain problems in cooperation with the LOGO pattern. There would be a large dark spot at the front and certain angles, which is not good for the light distribution determination.

In known light guiding devices, it has proven disadvantageous that the light deflected by the light guiding device is outcoupled relatively inhomogeneously over a surface to be illuminated. This effect becomes ever more obvious, the larger the surface to be illuminated and the greater the distance between the surface to be illuminated and a light source. For example if a pictogram of small line width, 0.4 mm for example, of a blind spot monitor is backlit by a known light guiding device, the inhomogeneity can be negligible. As the line width of the pictogram increases, 1.0 mm for example, the inhomogeneity becomes quite visible and the user finds it disturbing. In the extreme case, a very non-uniform illumination of a pictogram can cause the user to misinterpret an indicator light as not illuminated.

SUMMARY OF THE INVENTION

This invention relates in general to automotive rearview devices, such as mirrors and cameras, and more particularly to an indication device of a rearview device on a vehicle. In certain embodiments, the invention relates to a blind spot warning indication device for an exterior mirror of an automobile.

An indication device of a rearview device on a vehicle is disclosed in conjunction with embodiments of blind spot warning devices, though any indication or warning message may be provided by the indication device. The rearview device may be any vehicular device for providing a driver with a visual image of the rear and side areas of a vehicle, such as an automobile, a truck, a motorcycle, or other form of conveyance. In an illustrative example, a blind spot warning indicator for exterior mirrors of automobiles is described with a more reasonable structural design with reflection and scattering functions, better uniformity of front and angular uniformity, and better cooperation with the LOGO pattern. The blind spot warning indication device for an exterior mirror of an automobile comprises a light source assembly for emitting an indicating light beam, and a light guide member for reflecting the indicating light beam to a mirror surface marking region. The light source assembly and the light guide member are disposed in a mounting cavity of a carrier plate, such as a mirror mounting plate or a display screen mount. The light source assembly is composed of a printed circuit board (PCB) and a plurality of juxtaposed light sources mounted on the PCB. It is wherein: a plurality of wedge-shaped bosses are arranged side by side along an axis y on the light guide member corresponding to a setting direction of the PCB. One side of each of the plurality of wedge-shaped bosses has a light incident end surface for aligning with a corresponding light source. An upper surface of each of the plurality of wedge-shaped bosses includes a light reflecting side having an optical pattern for reflecting and scattering. The reflecting side having the optical pattern is an upward convex arc surface. A lower surface of the wedge-shaped boss has a light emitting side. The outermost wedge-shaped boss has the largest curvature of the light-reflecting side compared to the other wedge-shaped bosses arranged side by side. The outermost wedge-shaped boss has the longest length of the light-emitting side compared to the other wedge-shaped bosses arranged side by side.

Compared with the prior art, the present invention has the advantages that a plurality of wedge-shaped bosses are arranged side by side along an axis "Y" on the light guide member of the blind spot warning indication device for an exterior mirror of an automobile corresponding to a setting direction of the PCB. One side of each of the plurality of wedge-shaped bosses has a light incident end surface for aligning with a corresponding light source. An upper surface of each of the plurality of wedge-shaped bosses includes a convex arc light reflecting side having an optical pattern for reflecting and scattering. The lower surfaces of the plurality of wedge-shaped bosses have a light emitting side. The outermost wedge-shaped boss has the largest curvature of the light-reflecting side compared to the other wedge-shaped bosses arranged side by side. The outermost wedge-shaped boss has the longest length of the light-emitting side compared to the other wedge-shaped bosses arranged side by side.

In this way, the structural design of the invention is more reasonable, and the light guide member has the functions of reflection and scattering at the same time. The uniformity of the emitted light at the front surface and certain angles is better, and the warning effectiveness is improved. The LOGO pattern can be better combined with the emitted light. Dark spots are not present at the front surface and certain angles. This is beneficial for the light distribution determination and provides improved warning effectiveness.

The light guiding device has a light incoupling side for coupling light from a light source into the light guiding device, a reflection side having a reflection layer for reflecting the incoupled light and a light outcoupling side. The light outcoupling side is preferably disposed essentially opposite the reflection side. The clearance between the reflection side and the light outcoupling side preferably basically decreases as the distance from the light incoupling side increases. This decrease of the clearance can occur at least partially non-linear. In other words, the reflection side and/or the reflection layer can not only extend linearly inclined relative to the light outcoupling side, but can also extend arc-shaped or convex. The reflection side having the reflection layer is embodied so that the light arriving at the light outcoupling side from the light incoupling side is deflected in order to thus produce a light distribution on the light outcoupling side that is more uniform or is as uniform as possible.

The light guiding device can comprise a light guide body upon which the light incoupling side, the light outcoupling side and the reflection side are formed. The light guide body may be further be divided into discrete regions having independently operating light guiding funnels. Each independently operating light guiding funnel may provide homogenous illumination of a portion of the light outcoupling side to illuminate a target such as a logo or other pictogram for a specific purpose. In addition, each of the light guiding funnels may be further divided into discrete regions or focus areas within a particular funnel to provide a homogenous illumination over a portion of the light outcoupling side associated with a specific funnel. Alternatively, the light guiding funnels may be of different longitudinal or lateral dimensions yet each be configured to fully illuminate the respective light outcoupling regions associated therewith.

The light guiding device can be used in an illumination device to produce an illumination result over a certain surface that is as homogenous as possible by means of one or a plurality of light sources having a relatively limited light distribution, LEDs for example. The light guide device can be used in an indicator device of a motor vehicle, for example. An example is an indicator device in a rearview device like a driver assistance system, such as a blind spot monitor. The light guiding device according to the invention can particularly be used for the most homogenous possible illumination or backlighting of a pictogram, such as a blind spot monitor for example.

The reflection layer is arranged on the reflection side. The reflection layer may be configured as a paint or lacquer layer that is imprinted or evaporation-coated on the reflection side. Alternatively, the reflection layer can be made of another material or of the same material as the rest of the light guiding device. Preferred materials are plastics, especially acrylonitrile-butadiene-styrene (ABS) and or polymethyl methacrylate (PMMA) or plastics with similar material properties. For example, both the reflection layer and the rest of the light guiding device are made of PMMA. The light guiding device can also be a two-component plastic injection molded part, wherein the reflection layer is injected as an ABS plate, white or colored for example, and then the rest of the light guiding device is formed on the reflection layer with transparent or clear PMMA. In embodiments having independently operating regions, each tunnel includes the reflection layer.

The reflection side and/or the reflection layer can be configured at least partially step-like and/or wave-like. The steps or waves are embodied so that the light arriving from the light incoupling side is deflected so that it exits from the light outcoupling side as uniformly as possible. In embodiments having independently operating regions, each tunnel can have a specific reflection side and/or reflection layer. For example the step-like and/or wave-like configuration might be different for the different funnels and/or the respective configuration might be restricted to certain discrete funnel regions. Still further, a step-like and/or wave-like configuration can be provided in different directions, especially in both the longitudinal and the lateral directions, and can lead to a variety of 3-dimensional surface structures like a dome- or cushion-like configuration.

The light incoupling side and the light outcoupling side can be configured flat and these surfaces can be arranged essentially orthogonal or approximately orthogonal to one another. The surfaces of the light incoupling side and the light outcoupling side can form planes. The upper surface of the light incoupling side can be embodied or shaped in such a manner that light arriving from a light source is coupled into the light guiding device as completely as possible and preferably as parallel to the light outcoupling side as possible. To this end in particular the light incoupling side can demonstrate one or a plurality of optical systems and/or recesses, wherein light sources can be at least partially inserted into the recesses.

The light guiding device can be embodied so that light coupled into the light guiding device and/or reflected and/or outcoupled essentially experiences no change in color. To this end, the reflection layer can be made of a color-neutral material, which is silvery or white. A change in color can be obtained by arranging one or a plurality of color filters on the light incoupling side and/or the reflection side and/or the reflection layer and/or the light outcoupling side and/or inside the light guiding device. The light from a light source that emits white light can thereby be coupled out of the light guiding device colored, red or yellow or green for example. A color layer can have a heat resistance of around $-40°$ C. to $+115°$ C.

The light guiding device may also include one or a plurality of holding devices to tightly or loosely fasten the light guiding device to a printed circuit board.

The invention also relates to an illumination device where the surface of at least one of the light guiding funnel reflection sides is a compound wave-like surface reflecting light from the light incoupling side in both the longitudinal and lateral directions of the light outcoupling side. The light guiding device comprises at least one of the aforementioned features and a printed circuit board upon which at least one light source is arranged. The light source is arranged relative to the light guiding device so that the light emitted by the light source is at least partially incoupled on the light incoupling side of the light guiding device. The light is subsequently reflected from the reflection side and/or the reflection layer and outcoupled on the light outcoupling side. The illumination device can be used in a motor vehicle, such as in an indicator device of a rearview device of a motor vehicle.

There is further described a rearview device for a motor vehicle comprising a rearview reflection surface, one or a plurality of illuminants and a light guiding device according to the invention, wherein the illuminant and the light guiding device can be an indicator of a blind spot monitor. To this end, the light guiding device, light source and rearview reflection surface can be arranged together in such a way that the light guiding device deflects the light emitted by the light source to a side of the rearview reflection surface facing away from the driver of the vehicle. Thus one area of the rearview reflection surface can be visibly illuminated for the driver to provide an indicator function, a blind spot monitor for example. One region of the rearview reflection surface can comprise a recess or a partially reflecting part, such as a pictogram that the light source and the light guiding device visibly backlight for a driver.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
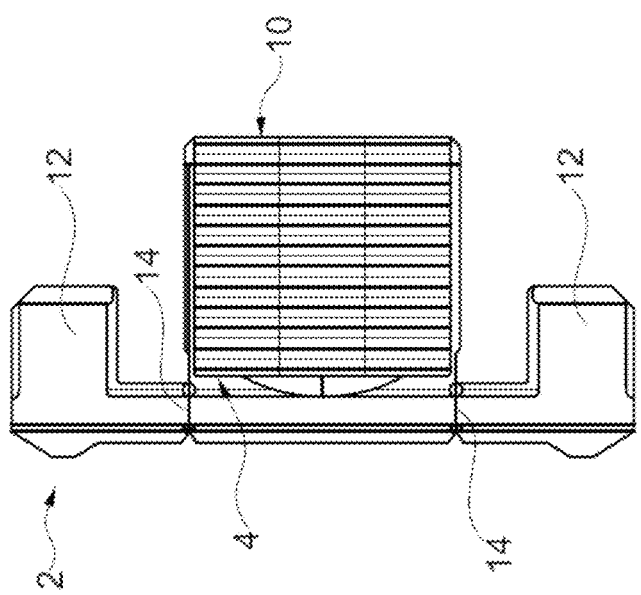
FIG. 1 is a top view of a first embodiment example of the light guiding device.

Referring now to the drawings, there is illustrated in FIG. 1 a top view of a light guiding device 2 having a light incoupling side 4, a reflection side 6, a reflection layer 8 (see FIG. 2), and a light outcoupling side 10. In the top view of FIG. 1 the reflection side 6 is disposed under the light outcoupling side 10 and the reflection layer 8 is disposed under the reflection side 6. The light outcoupling side 10 is disposed opposite the reflection side 6 and therefore also opposite the reflection layer 8, so that reflected light reaches the light outcoupling side 10 as uniformly as possible. The clearance between the light outcoupling side 10 and the reflection side 6 and therefore also the reflection layer 8 decreases as the distance from the light incoupling side 4 increases. The light outcoupling side 10 and the reflection side 6 can thus converge continuously or form an edge 14 that can also have a reflection layer 8.

By way of example FIG. 1 moreover depicts two holding devices 12, which extend away from the light guiding device 2 in the plane of the light outcoupling side 10, wherein each holding device demonstrates a predetermined breaking point 14. Depending on the application of the light guiding device, in a right or a left rearview device of a motor vehicle for example, the unneeded holding device 12 can be separated, broken off for example.

Figure 2:
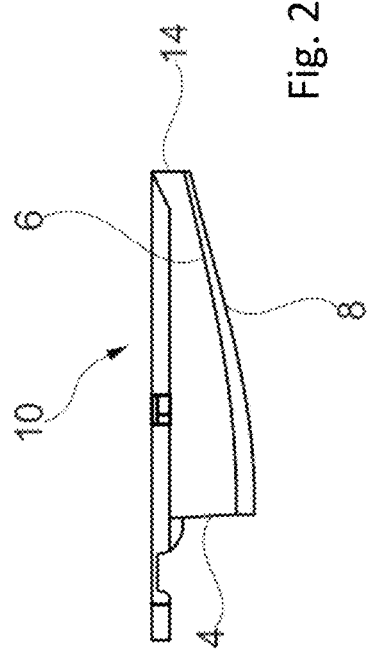
FIG. 2 is a side view of the first embodiment example according to FIG. 1.

FIG. 2 depicts a side view of the light guiding device of FIG. 1. Light can enter the light guiding device 2 through the light incoupling side 4, especially basically parallel to the light outcoupling side 10. The reflection side 6 and the reflection layer 8 then deflect the light in the direction of the light outcoupling side 10.

Figure 3A:
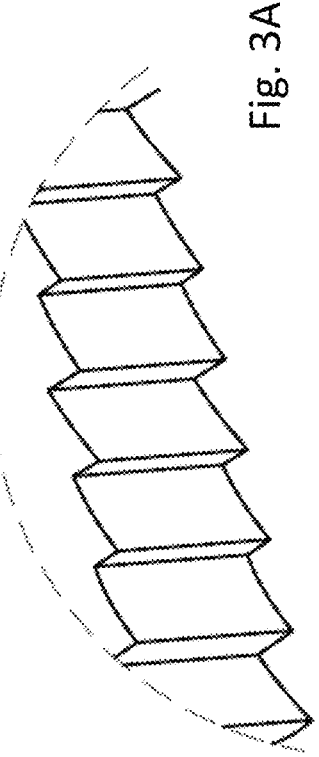
FIG. 3A is a reflection side or reflection layer having a step-like structure.
Figure 3C:
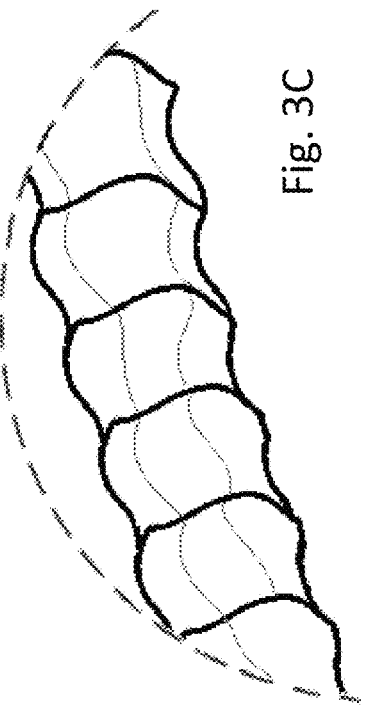
FIG. 3C is a reflection side or reflection layer having a wave-like structure.
Figure 3B:
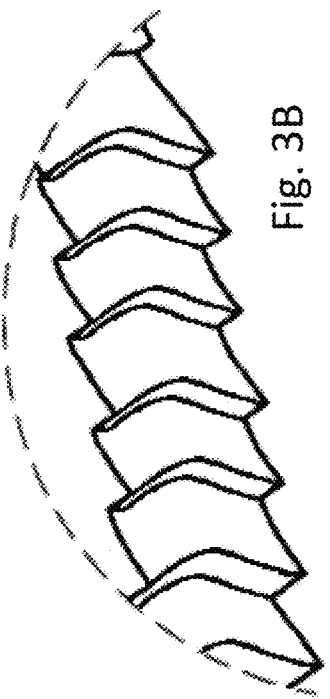
FIG. 3B is a reflection side or reflection layer having a combined step-like and wave-like structure.

FIG. 3A depicts an enlarged representation of a reflection side 6 and/or reflection layer 8 configured step-like. Such a step-like configuration, which can alternatively or additionally be wave-like, can improve the guidance of the light beam arriving from the light incoupling side 4 to the effect that the light outcoupling by the light outcoupling side 10 is distributed as homogeneously as possible and uniformly across the light outcoupling side 10. FIG. 3B depicts an enlarged representation of the reflection side 6 configured as a combined wave-like and step-like surface configuration. FIG. 3C depicts an enlarged representation of the reflection side 6 configured as a compound wave-like surface configuration in both the longitudinal and lateral directions of the light outcoupling side 10.

Figure 4:
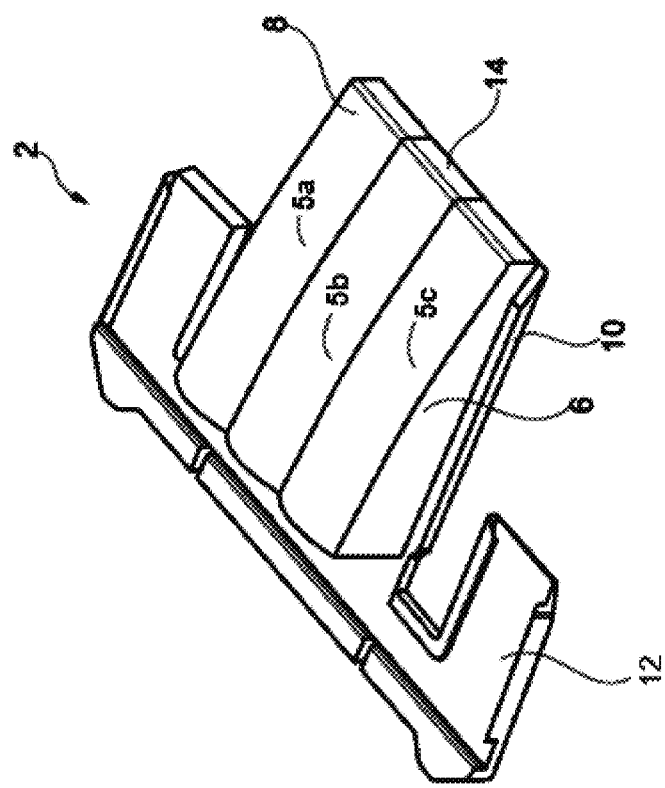
FIG. 4 is a perspective view of the embodiment example according to FIG. 1.

FIG. 4 depicts the light guiding device 2 in a perspective representation. The light guiding device 2, which is optimized for three light sources 18, has a reflection side 6 and reflection layer 8 configured with three funnels, 5a, 5b, and 5c; however more or fewer funnels may be provided if so desired. Still further, the funnels do not have to be identical, but may vary. The longitudinal axis of these funnels extends along the principal direction of the incoupled light. The light guiding device 2 can be adapted for any other number of light sources 18, such as 1, 2, 3, 4, 5, 6 or more.

Figure 5:
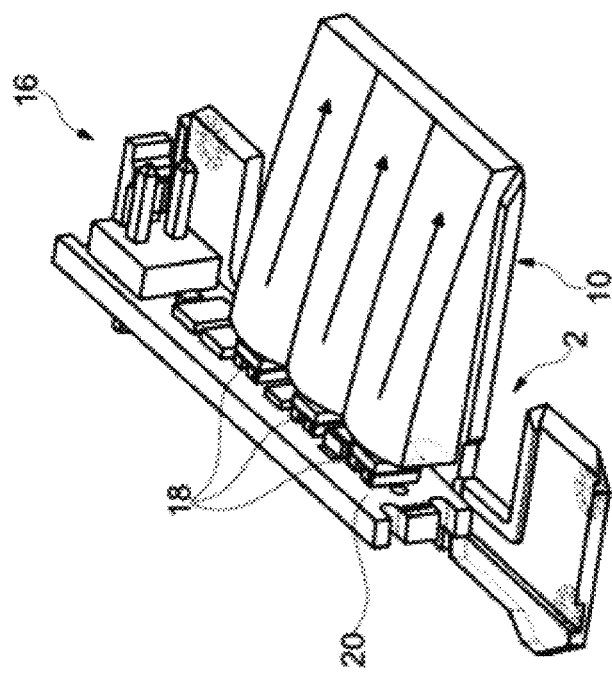
FIG. 5 is a perspective view of an illumination device having a light guiding device with focus on the light incoupling.
Figure 6:
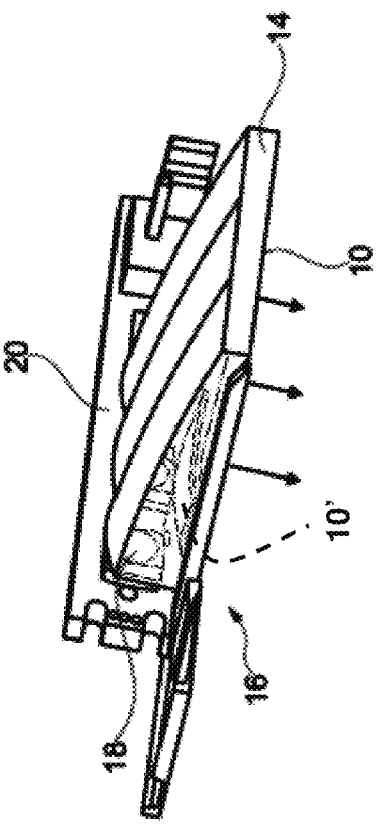
FIG. 6 is a perspective view of an illumination device having a light guiding device with focus on the light outcoupling.

FIGS. 5 and 6 depict an illumination device 16 having three light sources 18 which are arranged on a printed circuit board 20. The printed circuit board 20 having the LED light sources 18 is so arranged with respect to the light guiding device 2 that the light is emitted essentially parallel to the light outcoupling side 10, as illustrated by the arrows. To this end, the reflection side 6 and especially the reflection layer 8 deflect the light so that it leaves the light guiding device 2 via the light outcoupling side 10, as seen from the arrows in FIG. 6. As shown in a dotted outline, the light outcoupling side 10 may have a restricted light outcoupling window 10' that provides a homogeneous illumination output over an area less than the entire light outcoupling surface 10.

Figure 7B:
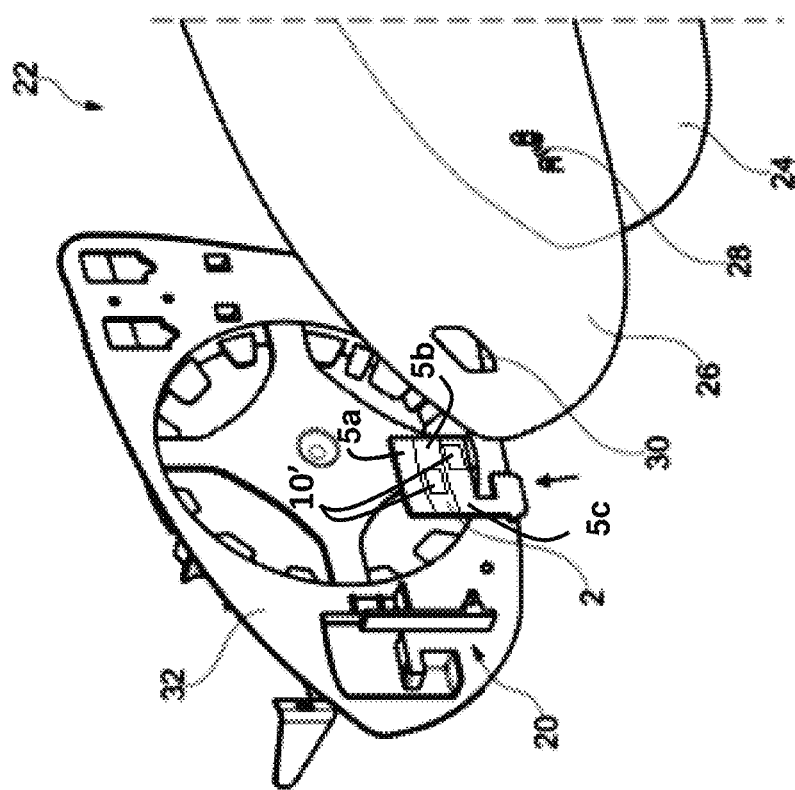
FIG. 7B is an exploded view of a rearview device, similar to FIG. 7A, having a selectively emitting light guiding device.
Figure 7A:
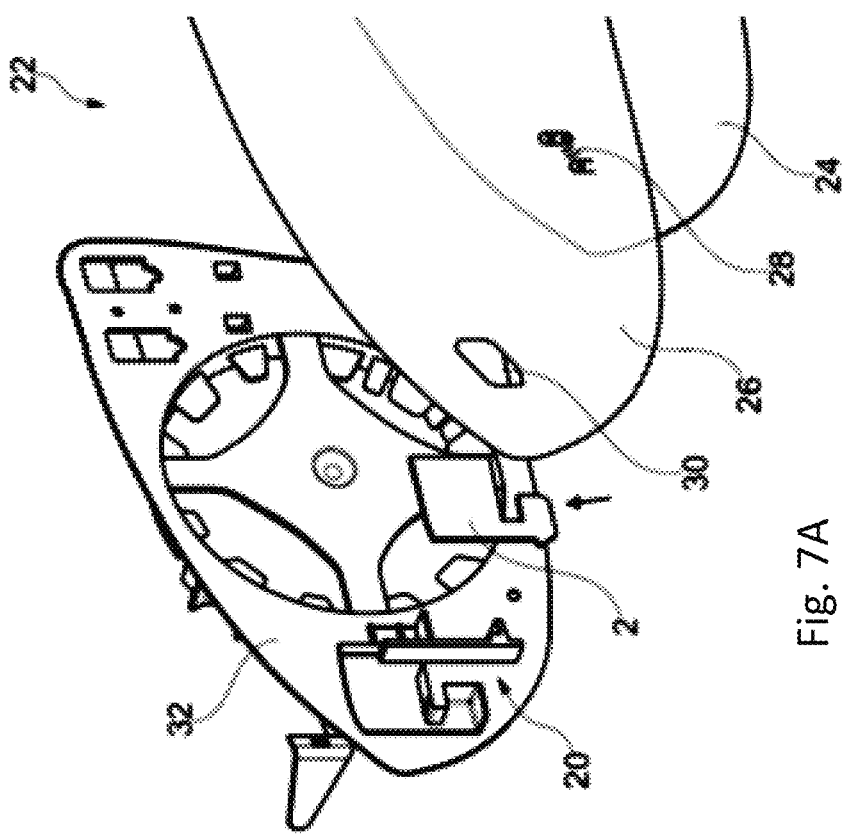
FIG. 7A is an exploded view of a rearview device having a light guiding device.
Figure 8:
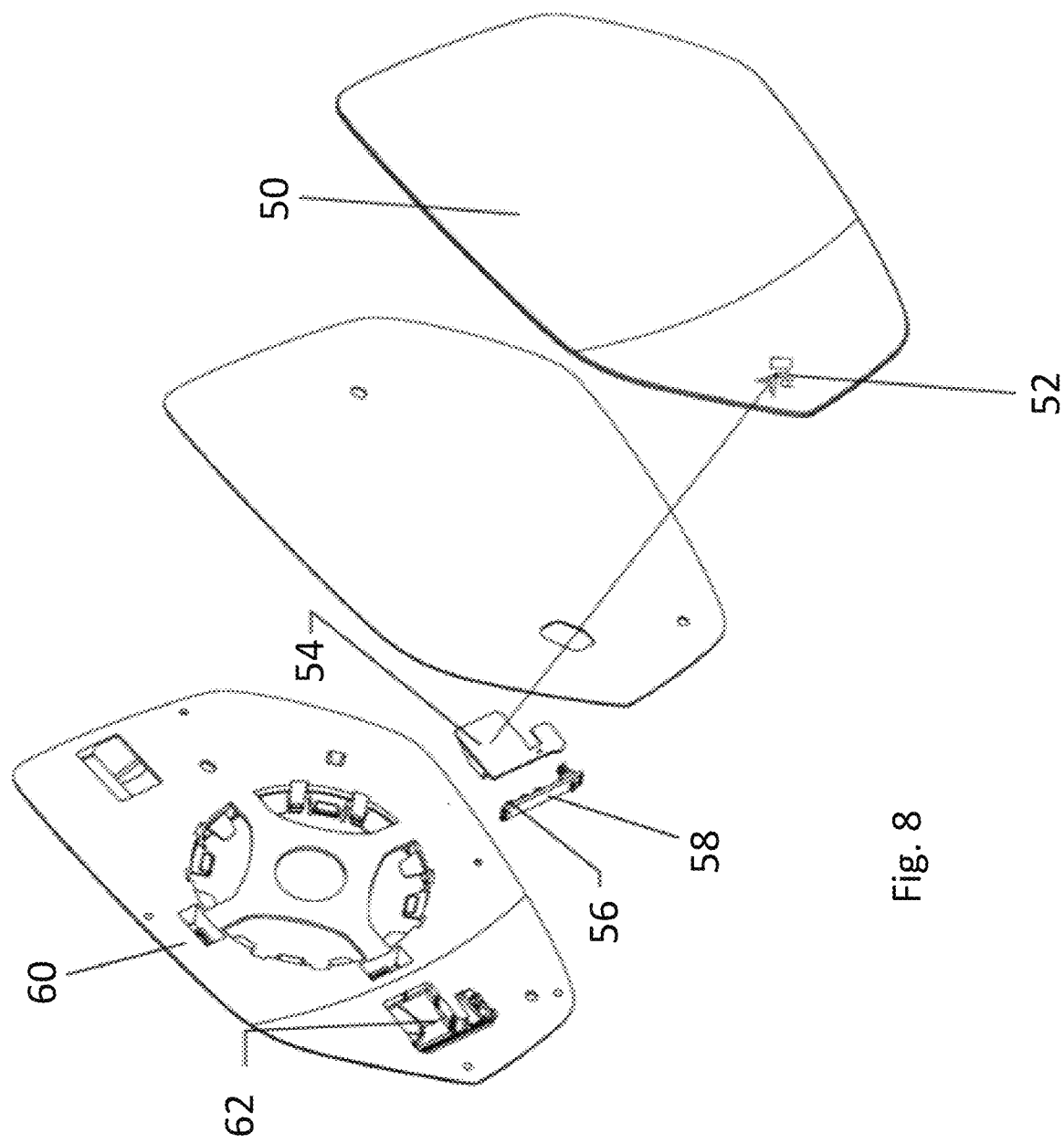
FIG. 8 is an exploded view of an indication device of a rearview device of a vehicle according to the invention.

FIG. 7A depicts an explosion view of a rearview device 22 having a light guiding device 2, which can be arranged on a printed circuit board 20 or directly on a mounting 32. The rearview device 22 furthermore has a rearview reflection surface 24 and a heating layer 26 thereunder, wherein the rearview reflection surface 24 has a pictogram for a blind spot monitor indicator, which can be illuminated by the light guiding device 2 and by a recess 30 in the heating layer 26. The printed circuit board 20, light guiding device 2 and rearview reflection surface 24 having the heating layer 26 can be arranged on a mounting 32. For the sake of clarity, the remaining parts of the rearview device 22, like the housing for example, are not illustrated.

FIG. 7B depicts an exploded view of a rearview device 22, similar to that shown in FIG. 7A, having a light guiding device 2 that includes restricted light outcoupling windows 10'. Each of the independently operable light guiding funnels 5a, 5b, and 5c may optionally include restricted light outcoupling windows 10' to illuminate a specific portion of the icon 28. As illustrated in FIG. 7B, fewer than all of the funnels 5a, 5b, and 5c may include one or more of the outcoupling windows 10' to illuminate select portions of the icon 28 or increase the illumination intensity of a portion of the icon. In the illustrated embodiment, the icon 28 comprises three regions representing a first vehicle, a second vehicle and a region between said two vehicles. Each light source 18 with its associated light guiding funnel 5a, 5b or 5c and light outcoupling window 10' can serve to homogenously illuminate one icon region. The light guiding funnels 5a-5c, the associated light sources 18, and the optional restricted light outcoupling windows 10' may emit different colors or may be sequentially strobed to provide an animation component to the icon to improve visibility.

Figure 9:
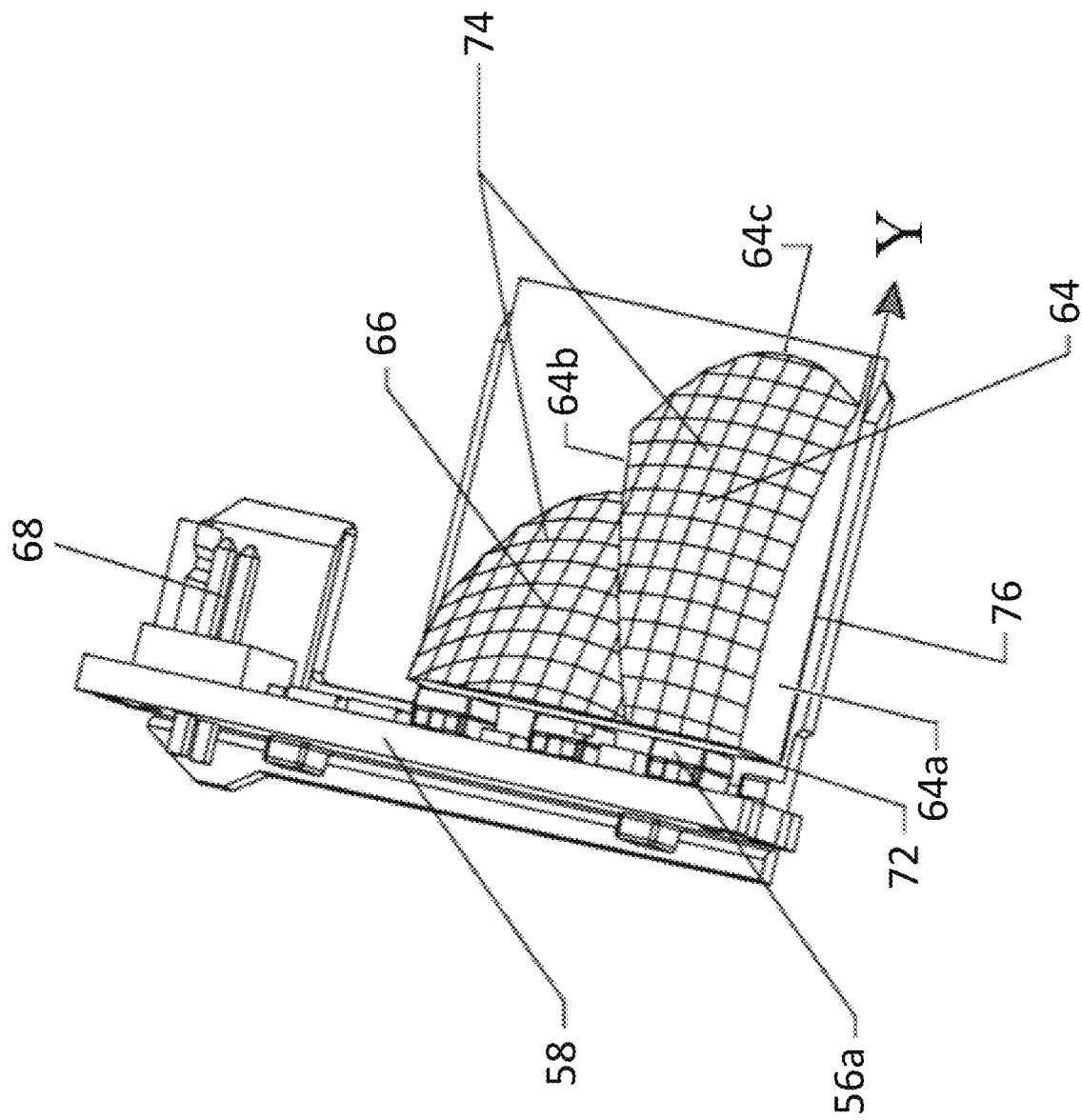
FIG. 9 is an enlarged, perspective view of an indicator of the indication device of FIG. 8.
Figure 10:
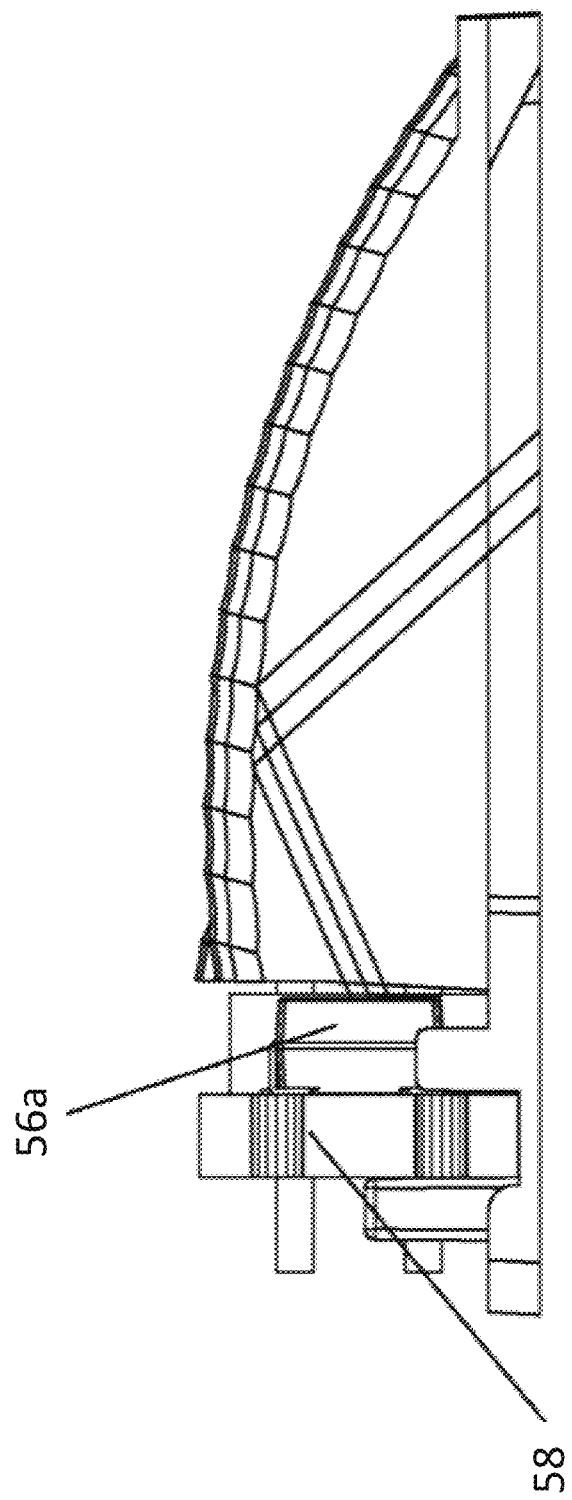
FIG. 10 is an elevational view of the light guide device of FIG. 9 showing a schematic illustration of a light emission and reflection path.

Referring now to FIGS. 8-11, there is illustrated an embodiment of an indication device of a rearview device on a vehicle. Specifically, the embodiment illustrates the indication device as a blind spot warning indication device for an exterior mirror of an automobile. However, the rearview device may be any vehicular device for providing a driver with a visual image of the rear and side areas of a vehicle, such as an automobile, a truck, a motorcycle, or other form of conveyance. The blind spot warning indication device comprises a light source assembly 56 for emitting an indicating light, and a light guide member 54 for reflecting the indicating light to a mirror surface 50 marking region, shown as a LOGO pattern 52. The light source assembly 56 and the light guide member 54 are disposed in a mounting cavity 62 of a mirror carrier plate 60. The light source assembly 56 is composed of a PCB 58 and a plurality of juxtaposed light sources 56a mounted on the PCB 58, as shown in FIG. 9. A plurality of wedge-shaped bosses, shown as a first or outermost wedge-shaped boss 64 and a second or adjacent wedge-shaped boss 66, are arranged side by side along an axis "Y" on the light guide member 54 corresponding to a setting direction of the PCB 58. One side of each of the plurality of wedge-shaped bosses 64 and 66 has a light incident end surface 72 for aligning with a corresponding light source. An upper surface of each of the plurality of wedge-shaped bosses 64 and 66 includes a light reflecting side 74 having an optical pattern for reflecting and scattering incoming light. The reflecting side 74 having the optical pattern is an upward convex arc surface. A lower surface of the wedge-shaped bosses 64 and 66 has a light emitting side 76. The outermost wedge-shaped boss 64 has the largest curvature of the light-reflecting side 74 compared to the other wedge-shaped boss 66, arranged side by side. The outermost wedge-shaped boss 64 has a length, L1, that is the longest length of the light-emitting side compared to a length, L2, of the other wedge-shaped boss 66 arranged side by side.

Figure 11:
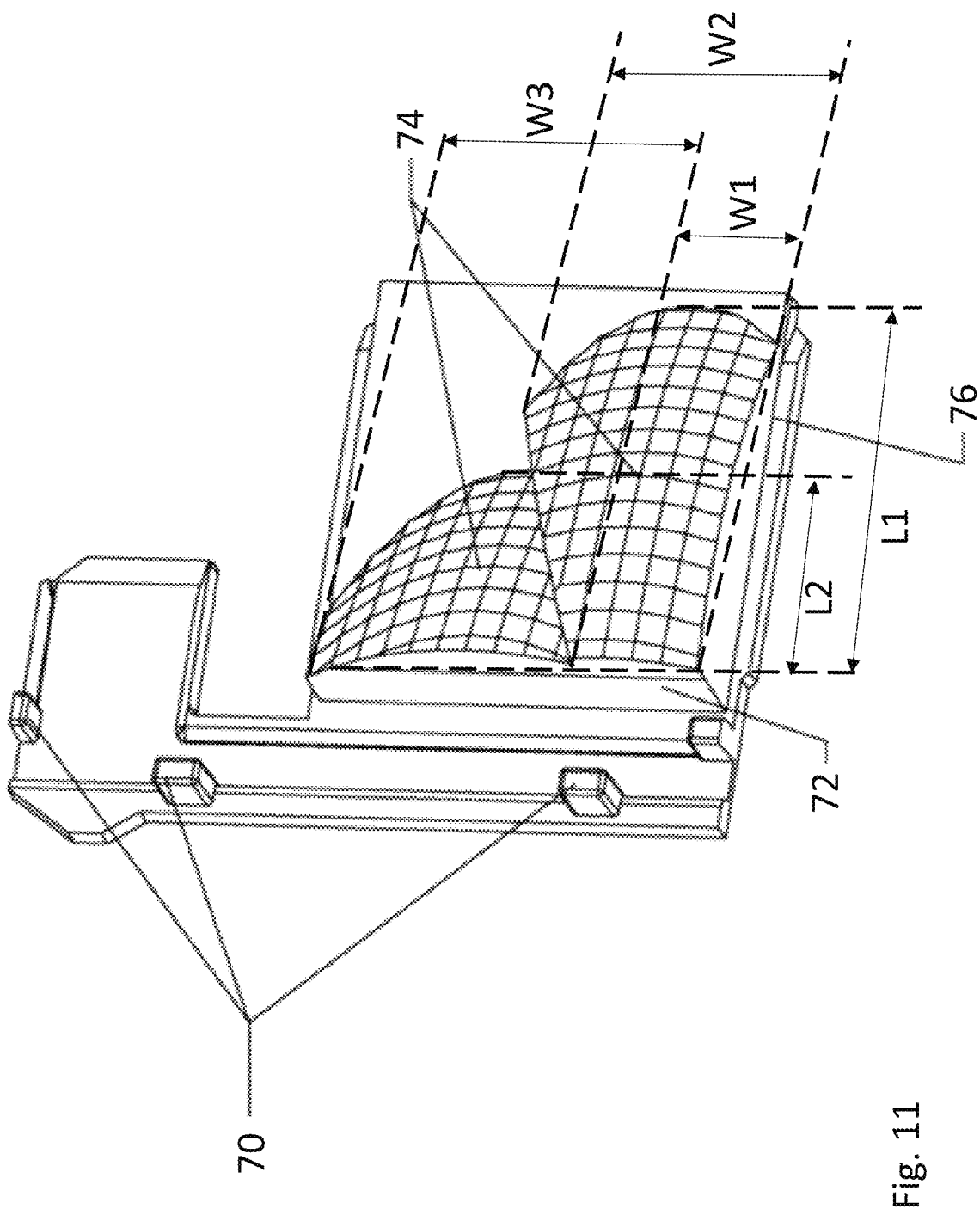
FIG. 11 is a perspective view of a light guide member of the indication device of FIG. 9.

The outermost wedge-shaped boss 64 has a fan-shaped or fin-shaped profile as shown in FIGS. 9 and 11. A width, W1, of the end of the outermost wedge-shaped boss 64 adjacent to the side of the PCB 58 is smaller than a width, W2, of the other side of the curved end, as shown in FIG. 11.

The upper surface of the light-reflecting side 74 has the optical pattern in the form of a thin strip, a lattice, or a wavy line, and the optical pattern has uniformly distributed concave and convex parts. The concave and convex parts may also be an optical pattern having concave and convex portions such as an arc shape, a triangle shape, a polygonal shape, or a hemispherical shape. The upper surface of the reflecting layer may also comprise a texture.

An outer side 64a of the first wedge-shaped boss 64 is a vertically disposed end surface. An inner side 64b of the first wedge-shaped boss 64 directly intersects with the second wedge-shaped boss 66, and an end side 64c of first wedge-shaped boss 64, away from one end of the PCB 58, is curved.

A width, W3, of the second wedge-shaped boss 66 adjacent to the side of the PCB 58 is greater than the width, W2, of the first wedge-shaped boss 64. The width, W3, of the side of the second wedge-shaped boss 66 adjacent to the PCB 58 is greater than or equal to twice the width, W1, of the side of the first wedge-shaped boss 64 adjacent to the PCB 58.

The light incident end surface 72 of the first wedge-shaped boss 64 corresponds to one light source of the plurality of light sources 56a, and the light incident end surface of the second wedge-shaped boss 66 corresponds to two light sources of the plurality of light sources 56a.

A plurality of alternately arranged bumps or tabs 70, used for locating the PCB 58 and light source assembly 56 relative to the wedge-shaped bosses 64 and 66, are disposed along an edge of the light guide member 54 at the position where the light guide member 54 is matched with the PCB 58.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An indication device for a rearview device of a vehicle, comprising:
   a light source assembly for emitting an indicating light beam, and
   a light guide member for reflecting the indicating light beam to a marking region, wherein the light source assembly and the light guide member are disposed in a mounting cavity of a carrier plate, the light source assembly comprises a printed circuit board (PCB) and a plurality of juxtaposed light sources mounted on the PCB, and wherein the light guide member comprises:
   a plurality of wedge-shaped bosses arranged side by side along an axis on the light guide member corresponding to a setting direction of the PCB;

one side of each of the plurality of wedge-shaped bosses has a light incident end surface for aligning with a corresponding light source;

an upper surface of each of the plurality of wedge-shaped bosses includes a light-reflecting side having an optical pattern for reflecting and scattering and at least a portion having one of a wave-like configuration or a combined step-like and wave-like configuration;

the light-reflecting side having the optical pattern is an upward convex arc surface;

a lower surface of the each of the plurality of wedge-shaped bosses has a light emitting side; and an outermost wedge-shaped boss has a largest curvature of the light-reflecting side compared to the remaining plurality of wedge-shaped bosses arranged side by side and has a longest length of the light-emitting side compared to the remaining plurality of wedge-shaped bosses arranged side by side.

2. The indication device of claim 1, wherein the outermost wedge-shaped boss has a fan-shaped or fin-shaped profile, and the width of the end of the outermost wedge-shaped boss adjacent to the side of the PCB is smaller than the width of the other side of the curved end.

3. The indication device of claim 1, wherein the at least a portion of the light reflecting side of at least one of the plurality of wedge-shaped bosses is the wave-like configuration.

4. The indication device of claim 1, wherein the at least a portion of the light reflecting side of at least one of the plurality of wedge-shaped bosses is the combined step-like and wave-like configuration.

5. The indication device of claim 1, wherein the upper surface of the light-reflecting side has the optical pattern in the form of a thin strip or a lattice or a wavy line, and the optical pattern is uniformly distributed concave and convex parts.

6. The indication device of claim 1, wherein
the number of the wedge-shaped bosses is two;
the two wedge-shaped bosses comprise a first wedge-shaped boss and a second wedge-shaped boss which are arranged side by side;
the first wedge-shaped boss is an outer wedge-shaped boss;
an outer side of the first wedge-shaped boss is a vertically disposed end surface;
an inner side of the first wedge-shaped boss directly intersects with the second wedge-shaped boss; and
the side of first wedge-shaped boss away from one end of the PCB is curved.

7. The indication device of claim 6, wherein the width of the second wedge-shaped boss adjacent to the side of the PCB is greater than the width of the first wedge-shaped boss.

8. The indication device of claim 7, wherein the width of the side of the second wedge-shaped boss adjacent to the PCB is greater than or equal to twice the width of the side of the first wedge-shaped boss adjacent to the PCB.

9. The indication device of claim 1, wherein the plurality of wedge-shaped bosses are a first wedge-shaped boss and second wedge-shaped boss, and a plurality of alternately arranged bumps used for locating the PCB and light source assembly relative to the first and second wedge-shaped bosses are disposed along an edge of the light guide member at the position where the light guide member is matched with the PCB.

10. The indication device of claim 1, wherein the light source assembly is responsive to a detected vehicle in a driver blind spot and the indication device is a blind spot warning indication device.

11. The indication device of claim 1, wherein the rearview device is one of an interior rearview mirror, an exterior mirror mounted for driver viewing within the vehicle, or a display unit receiving a camera image; the carrier plate is a mirror carrier plate or a display carrier plate; and the marking region is a mirror surface marking region or display marking region.

12. The indication device of claim 1, wherein the plurality of wedge-shaped bosses are two wedge-shaped bosses.

13. A blind spot warning indication device for an exterior mirror of a vehicle, comprising:
a light source assembly for emitting an indicating light beam, and
a light guide member for reflecting the indicating light beam to a mirror surface marking region, wherein the light source assembly and the light guide member are disposed in a mounting cavity of a mirror plate of the exterior mirror, the light source assembly comprises a printed circuit board (PCB) and a plurality of juxtaposed light sources mounted on the PCB, and wherein the light guide member comprises:
two wedge-shaped bosses are arranged side by side along an axis on the light guide member, a first wedge-shaped boss defining an outermost wedge-shaped boss and a second wedge-shaped boss abutting the first wedge-shaped boss;
one side of each of the two wedge-shaped bosses has a light incident end surface for aligning with a corresponding light source;
an upper surface of each of the two wedge-shaped bosses includes a light reflecting side having an optical pattern for reflecting and scattering light configured as an upward convex arc surface and the upper surface of one of the two wedge-shaped bosses includes a portion having at least one of a wave-like configuration or a combined step-like and wave-like configuration;
a lower surface of the two wedge-shaped bosses has a light emitting side; and
the first wedge-shaped boss has the largest curvature of the light-reflecting side and the longest length of the light-emitting side compared to the second wedge-shaped bosses.

14. The blind spot warning indication device of claim 13, wherein the portion of the upper surface of the at least one of the two wedge-shaped bosses is a combined step-like and wave-like pattern.

15. The blind spot warning indication device of claim 13, wherein the upper surface of the light-reflecting side has the optical pattern in the form of one of a thin strip, a lattice, or a wavy line.

16. The blind spot warning indication device of claim 13, wherein
the optical pattern is uniformly distributed concave and convex parts;
an outer side of the first wedge-shaped boss is a vertically disposed end surface;
an inner side of the outermost wedge-shaped boss directly intersects with the other wedge-shaped boss; and
the side of first wedge-shaped boss away from one end of the PCB is curved.

17. The blind spot warning indication device of claim 13, wherein the width of one wedge-shaped boss adjacent to the side of the PCB is greater than the width of the other wedge-shaped boss.

18. The blind spot warning indication device of claim 17, wherein the width of the side of the one wedge-shaped boss adjacent to the side of the PCB is greater than or equal to twice the width of the side of the first wedge-shaped boss adjacent to the PCB.

19. The blind spot warning indication device of claim 13, wherein a plurality of alternately arranged bumps used for locating the PCB and light source assembly relative to the first and second wedge-shaped bosses are disposed along an edge of the light guide member at the position where the light guide member is matched with the PCB.

20. The blind spot warning indication device of claim 13, wherein the wave-like pattern is oriented along the axis on the light guide member and repeated along an axis perpendicular to the axis of the side by side orientation of the two bosses.

\* \* \* \* \*